United States Patent Office 3,467,707
Patented Sept. 16, 1969

3,467,707
CERTAIN AMINO SUBSTITUTED HYDRAZIDE EPOXY RESIN CURING AGENTS
David Aelony, Minneapolis, Minn., assignor to General Mills, Inc., a corporation of Delaware
No Drawing. Filed Oct. 1, 1965, Ser. No. 492,298
Int. Cl. C08g *30/14*
U.S. Cl. 260—561
6 Claims

ABSTRACT OF THE DISCLOSURE

Compounds having the formula

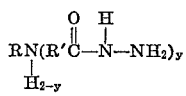

where R' is an alklene radical of 2 to about 11 carbon atoms y is an integer selected from 1 and 2 and R is selected from the group consisting of an aliphatic radical of 1 to about 24 carbon atoms attached to the nitrogen atom through a primary carbon atom, an aryl radical of 6 to about 40 carbon atoms having the structure

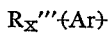

and an aralkyl radical of 7 to about 40 carbon atoms having the structure

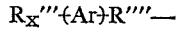

where Ar is the cyclic moiety, R''' is an aliphatic radical, R'''' is an alkylene radical of 1 to 10 carbon atoms attached to the nitrogen atom through a primary carbon atom and x is an integer of 0 to about 4. Curable, partially cured and cured compositions are prepared from such hydrazides and epoxy resins.

The present invention relates to certain novel hydrazides and the use thereof as curing agents for epoxy resins. More particularly, it relates to certain amino substituted hydrazides which are especially useful as curing agents for epoxy resins.

Epoxy resins have been known and used commercially for some time, and these resins have been described in substantial detail in numerous publication and patents. For example, epoxy resins are described in substantial detail in such recently issued United States patents as Nos. 2,923,696; 3,026,285; 3,067,170; 3,072,606; 3,072,607; 3,073,799; 3,079,367; 3,080,341; and 3,084,139, each of which patents is included herein by reference as disclosing typical epoxy resins which are used in the practice of the instant invention.

The epoxy resins are known to produce a number of valuable products, and particularly in the coating arts, the epoxy resins are known to produce infusible, insoluble coatings or films which when properly cured exhibit desirable properties such as toughness, thermal stability, and the like. The known curing agents for such epoxy resins, however, have been found to leave something to be desired. For example, the common aliphatic polyamines react rapidly at room temperature and at elevated temperatures with epoxy resins. They therefore possess poor storage stability. In addition, since most of the compounds of this class are liquids, they are difficult to utilize in powder systems. Other systems that have been utilized are the aminotriazines, anhydrides, and aromatic diamines. These compounds, however, give moderate rates of reaction with epoxy resins at low and high temperatures and consequently cure rates are quite slow.

The hydrazides of the present invention have the advantage of being compatible with epoxy resins to form compositions which are stable at room temperature. They can also be readily and easily reacted at elevated temperatures with epoxy resins and the reaction can be terminated prior to completion to provide stable, homogeneous B-stage resins of high utility. The hydrazide-epoxy resin compositions are tolerant to the addition of pigments and fillers. Such systems can also be finely divided to provide stable, homogeneous powders for use in coating a variety of substrates by such methods as spraying and fluidization thereof. The admixtures or B-stage resins, even though stable at ambient room temperatures, are rapidly cured when heated to elevated temperatures.

It is, therefore, an important object of the instant invention to provide an improved epoxy curing agent.

Another object of the invention is to provide an improved hardenable epoxy resin composition.

Still another object is to provide an improved partially cured, hardenable epoxy resin composition.

A further object of the invention is to provide an improved infusible insoluble epoxy resin product.

Other and further objects, features and advantages of the present invention will become apparent to those skilled in the art from the following detailed disclosure thereof, including the Examples hereof.

In general, the instant invention consists in a new substance or material that is a hydrazide of an adduct having the formula:

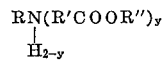

where R is an aliphatic radical of 1 to about 24 carbon atoms attached to the nitrogen atom through a primary carbon atom, or an aryl group which may or may not be substituted such as with aliphatic groups to give an alkaryl group, or an aralkyl group wherein the aryl group may or may not be substituted such as with additional aliphatic groups; R' is a straight or branched chain alkylene radical of from 2 to about 11 carbon atoms; R'' is an alphatic, preferably alkyl, group of 1 to about 4 carbon atoms; y is 1 or 2. It is preferred that R and R' are unsubstituted hydrocarbon radicals. The present invention further consists in hardenable compositions prepared from such hydrazides and epoxy resins and in infusible, insoluble resinous products prepared from such hardenable compositions.

One preferred method of preparing the adducts used to produce the hydrazides of the present invention is to condense a primary amine and a lower aliphatic ester of an alpha, beta unsaturated acid. Representative primary aliphatic amines used in such condensation reaction are methyl amine, ethyl amine, propyl amine, butyl amine, pentyl amine, hexyl amine, heptyl amine, octyl amine, nonyl amine, decyl amine, undecyl amine, dodecyl amine, hexadecyl amine, octadecyl amine, hexenyl amine, heptenyl amine, octenyl amine, decenyl amine, hexadecenyl amine, octadecenyl amine, stearyl amine, oleyl amine, pentynyl amine, hexynyl amine, octynyl amine, decynyl amine, dodecynyl amine, tetradecynyl amine, pentadecynyl amine, hexadecynyl amine, octadecynyl amine and the like. Said amines may be branched providing that the branching does not occur on the carbon attached to the nitrogen atom. Representative substituents are methyl, ethyl, propyl, butyl, pentyl, hexyl, hexenyl, heptyl, heptenyl, heptynyl, octyl, octenyl, decyl and the like. The amines may contain one or more side chains, may be mono-, di-, or tri-unsaturated, and may be substituted with inert or noninterfering groups such as chlorine, nitro, and the like.

Representative aryl amines are phenylamine or aniline, napthylamine and the like, as well as substituted derivatives thereof, including the alkaryl amines. Such amines can be represented by the formula:

$$H_2N(Ar)R_x'''$$

where Ar is the cyclic moiety, R''' is a substituent such as methyl, ethyl, propyl, butyl, pentyl, pentenyl, hexenyl, hexyl, 2-ethyl hexyl, hexynyl, octyl, decyl, decenyl, decynyl, and the like. Either the cyclic moiety or the substituent may contain inert or non-interfering groups such as halogen, nitro, and the like. The aryl amines preferably contain from about 6 to 40 carbon atoms and it is preferred that the cyclic moiety contains no more than about 2 substituents. It is even more preferred that the cyclic moiety contains 1 or less substituents. $x$ in the above formula is an integer representing the number of aliphatic substituents on the cyclic moiety.

A representative aralkyl amine is benzyl amine. Such amines can be represented by the formula $$H_2N-R''''(Ar)R_x'''$$

where R''' and $x$ have the meanings set forth above, $x$ preferably being 0 or 1 to about 4. R'''' is an alkylene radical which may be branched but not on the carbon attached to the nitrogen atom. Said radical preferably contains from about 1 to 10 carbon atoms. Either the cyclic moiety, R'''' or the substituent R''' may contain inert or non-interfering groups. Such aralkyl amines preferably contain from 7 to 40 carbon atoms and it is preferred that the cyclic moiety contain less than two aliphatic substituents.

The preferred amines are the straight chain saturated aliphatic amines, phenyl amine and benzyl amine. The preferred esters to be condensed with the said primary amines are the esters of α,β-unsaturated acids such as the lower aliphatic esters of acrylic acid, methacrylic acid and crotonic acid. Such condensation reaction can be illustrated as follows:

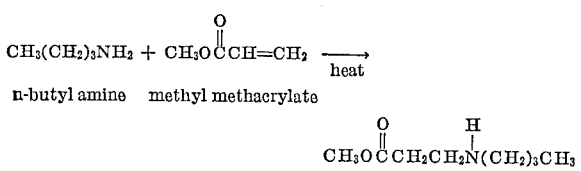

Where about 2 moles of methyl methacrylate are employed for each mole of the amine, the reaction can be illustrated as follows:

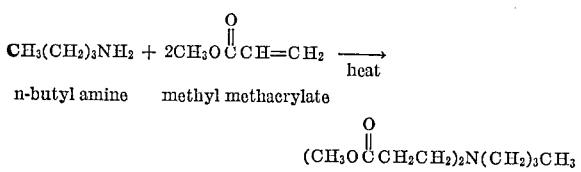

Of course, the reaction may produce a mixture of the two adducts set forth above and said mixture can also be used to prepare a mixture of hydrazides according to the present invention.

The condensation of the primary amine and the ester is preferably carried out at temperatures of from about 10 to 120° C. At room temperature or lower the reaction requires a somewhat extended period of time. It is also preferred that such reaction be carried out in the presence of a lower aliphatic alcohol or 1,4-dioxane, the same accelerating the reaction. Representative alcohols are methanol, ethanol, propanol, isopropanol, n-butanol, secondary butanols and tertiary butanols. Preferably quantities of about 2 to 25% by weight based on the total weight of the reactants are employed. This preferred process is further described in Harrison and Aelony Patent No. 2,787,633 which disclosure is incorporated herein by reference.

Another method of preparing the adducts used to produce the hydrazides of my invention is by reductive amination of esters of aldehydric acids. This reaction can be illustrated as follows:

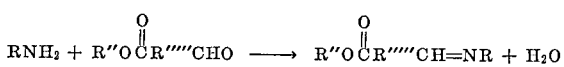

The resulting product is then hydrogenated to yield

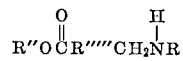

The condensation and hydrogenation are preferably carried out in a single step. R''''' represents a divalent straight chain or branched chain alkylene group which preferably contains from 2 to about 10 carbon atoms. Said group may contain inert or non-interfering substituents.

Representative aldehydic esters for use in the above method are propyl succinaldehydate, isopropyl succinaldehydate, sec.-butyl succinaldehydate, tert.-butyl succinaldehydate, the corresponding propyl-, isopropyl-, sec.-butyl-, and tert.-butyl gluteraldehydates, adipaldehydates, pimelaldehydates, and sebacaldehydates and the corresponding esters of β-methylglutaraldehydic acid, γ,γ-dimethylglutaraldehydic acid, and the like. The useful amines are those described hereinabove. This reaction is preferably carried out at from 115 to 160° C., at a pressure of from 1 to 1000 atmospheres and in the presence of hydrogen and a hydrogenation catalyst.

The following examples illustrates the preparation of the noted adducts:

EXAMPLE A

Preparation of methyl N-butyl-β-aminopropionate

One hundred eighty-five ml. of methyl acrylate (2.02 moles) were added dropwise to an agitating solution of 200 ml. (2 moles) of butyl amine in 200 ml. of methanol at a temperature of 10–18° C. After all of the acrylate was added, agitation was continued for an additional three hours. The reaction mixture was then allowed to stand overnight. The solvent was removed by evaporation and the residue was fractionated through a two ft. Vigreux column topped with a Claisen head. Two fractions were obtained, the first weighing 221.5 grams and the second weighing 66 grams. The product of fraction 1 has the structure:

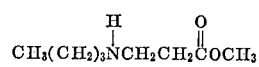

EXAMPLE B

Preparation of methyl N-butyl-β-aminopropionate

Three hundred seventy ml. (4.04 moles) of methyl acrylate and 400 ml. (4 moles) of butylamine were reacted similarly as in Example A except that agitation was continued for four hours and the first fraction collected was refractionated giving 431 grams of the methyl N-butyl-β-aminopropionate.

EXAMPLE C

Preparation of methyl N-octadecyl-β-aminopropionate

Ninety-seven ml. (20% excess) of methyl acrylate were slowly added to 269 grams of stearyl amine in 100 ml. of methanol at 64° C. After refluxing for four hours, the methanol and excess methyl acrylate were removed by evaporation. There was obtained 361 grams of product, the compound having the structure:

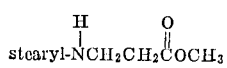

EXAMPLE D

Preparation of methyl N-methyl-β-aminopropionate

One hundred eighty-five ml. of methyl acrylate were slowly added to an agitating solution of 62 grams of methyl amine in 500 ml. of methanol. The reaction mixture was allowed to stand overnight and then excess methyl acrylate and the methanol were removed by evaporation. The residue was fractionated by means of a two ft. Vigreux column topped with a Claisen head to yield a first fraction weighing 46.5 grams, a second fraction weighing 74 grams and a residue which weighed 77 grams. The first fraction was refractionated, yielding 37 grams of product. The methyl N-methyl-β-aminopropionate has the structure:

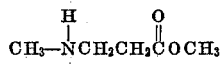

EXAMPLE E

Preparation of methyl N-benyl-β-aminopropionate

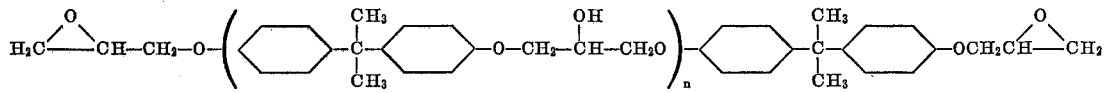

Eighty-one ml. of methyl acrylate were slowly added with cooling and agitation to 93 grams of benzylamine in 100 ml. of methanol. The reaction mixture was allowed to stand over a two day period and then excess methyl acrylate and the methanol solvent were evaporated under vacuum. The reaction mixture was distilled to yield 144 grams of distillate having a nitrogen content of 7.1 (theoretical 7.25). The methyl N-benzyl-β-aminopropionate has the structure:

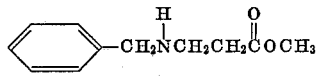

EXAMPLE F

Preparation of methyl N-dodecyl-β-aminopropionate

Ninety-seven ml. (20% excess) of methyl acrylate were slowly added to an agitating solution of 185 grams of N-dodecyl amine in 110 ml. of methanol. After refluxing the reaction mixture for four hours, excess methylacrylate and methanol were removed by evaporation under vacuum. The product was methyl N-dodecyl-β-aminopropionate having the structure:

EXAMPLE G

Preparation of methyl N-octyl-β-aminopropionate

Ninety-four ml. of methyl acrylate were slowly added to an agitating solution of 125 grams of octyl amine in 50 ml. of methanol. The reaction mixture was refluxed for four hours and then excess methyl acrylate and methanol were removed by evaporation. The resulting residue was fractionated in vacuo using a two ft. Vigreux column topped with a Claisen head. One hundred seventy-five grams of product were obtained having a nitrogen content of 6.4 (theoretical 6.5). The methyl N-octyl-β-aminopropionate has the structure:

EXAMPLE H

Preparation of ethyl N-methyl-β-iminodipropionate

To 31 grams of methylamine in 500 ml. of benzene and 200 ml. tetrahydrofuran were added 100 ml. of ethylacrylate. The reaction mixture was then allowed to stand overnight. To 33 grams of methylamine in 600 ml. of tetrahydrofuran were added 117 ml. of ethylacrylate and this reaction mixture was also allowed to stand overnight. These two preparations were combined and fractionated through a two ft. Vigreux column topped with a Claisen head using water pump vacuum. The first fraction weighed 100 grams and the second fraction weighed 142 grams. The product of the latter fraction had the formula:

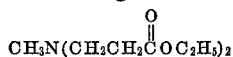

As indicated above the hydrazides of the present invention are particularly useful as curing agents for epoxy resins. Any epoxy resin can be used in the present invention. Suitable resins include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone, and the like. A typical epoxy resin of this type is the reaction product of epichlorohydrin and 2,2-bis(p-hydroxyphenyl)propane (Bisphenol A), the resin having the following theoretical structural formula:

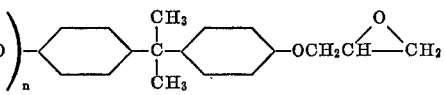

where $n$ to 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl)sulfone. Still another group of epoxy compounds which may be employed are the glycidyl esters of polymeric fat acids. These glycidyl esters are obtained by reacting the polymeric fat acids with polyfunctional halohydrins such as epicholorhydrins. In addition, the glycidyl esters are also commercially available epoxide materials. As the polymeric fat acids are composed largely of dimeric acids, the glycidyl esters thereof may be represented by the following theoretical, idealized formula:

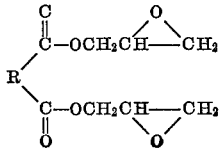

where R is the divalent hydrocarbon radical of dimerized unsaturated fatty acids.

The polymeric fat acids are well known materials, commercially available, which are the products prepared from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticica, cottonseed, corn, sunflower, safflower, dehydrated castor oil, and the like. The term "polymeric fat acids," as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 6 to 22 carbon atoms. Illustrative thereof are oleic, linolenic, palmitoleic, and the like. Glycidyl esters of other polybasic acids, such as phthalic and sebacic acids, may be employed.

Other types of epoxy resins which may be used with the hydrazide compositions of the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, omega, omega-tetrakis (hydroxyphenyl) alkanes, such as 1,1,2,2-tetrakis (hydroxyphenyl) ethane, 1,1,4,4-tetrakic (hydroxyphenyl) butane, 1,1,4,4 - tetrakis (hydroxyphenyl)-2-ethylbutane and the like. The epoxy resin reaction product of epichlorohydrin and tetraphenol may be represented by the following theoretical structural formula:

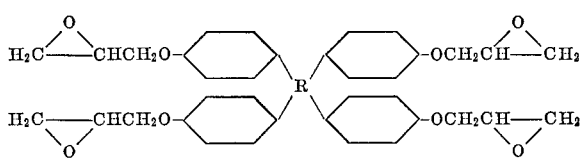

where R is a tetravalent aliphatic hydrocarbon chain having from 2 to 10, and preferably, from 2 to 6 carbon atoms.

Still another group of epoxide materials are the epoxidized novolac resins. Such resins are well known substances an dreadily available commercially. The resins may be represented by the following theoretical, idealized formula:

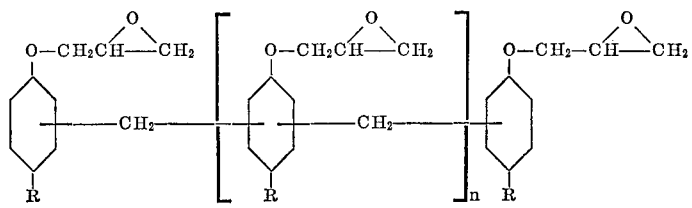

where R is selected from the group consisting of hydrogen and alkyl groups having up to 18 carbon atoms, and $n$ is an integer of from 1 to 10. Generally, $n$ will be an integer in excess of 1 to about 5.

In general, these resins are obtained by epoxidation of the well-known novolac resins. The novolac resins, as is known in the art, are produced by condensing the phenol with an aldehyde in the presence of an acid catalyst. Although novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the para carbon atom of the parent phenolic nucleus. However, novolac resins in which the alkyl group is in the ortho position have been prepared.

The epoxidized nololac resin is formed in the wellknown manner by adding the novolac resins to the epichlorohydrin and then adding an alkali metal hydroxide to the mixture so as to effect the desired condensation reaction.

In addition, other epoxy resins which may be used with the hydrazides of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

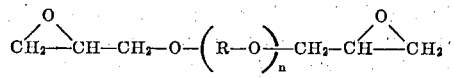

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Patent 2,923,696.

In general, the epoxy resins may be described as those having terminal epoxide groups, or at least as having more than one epoxide group per molecule.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

The hydrazides of the present invention have the formula:

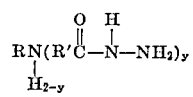

where R, R' and $y$ have the meanings set forth above. They are prepared by reacting hydrazine with the adduct of the formula:

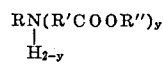

This reaction can be illustrated as follows:

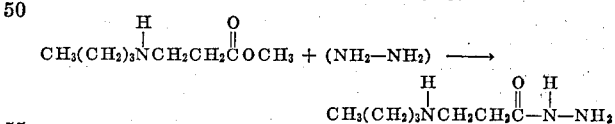

and

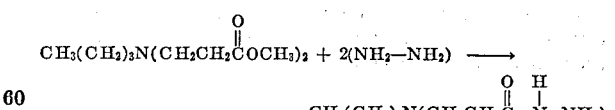

The reaction is preferably carried out using aqueous hydrazine of high concentration—i.e. 97% hydrazine by weight. It is also preferred to carry out the reaction in the presence of a lower aliphatic alcohol such as methanol. While the reaction can be completed at room temperature, higher temperatures on the order of 80 to 110° C. are preferred. Reflux conditions are especially preferred. The following examples illustrate the preparation of the hydrazides of the present invention.

EXAMPLE 1

Preparation of N-butyl-β-aminopropionhydrazide

Two hundred twenty-one and one half grams of methyl N-butyl-β-aminopropionate as prepared in Example A and 50 ml. of 97% hydrazine were mixed and heated at 100° C. for 12 hours. The reaction mixture was evaporated to 120° C. at 8 mm. of pressure and then placed under high vacuum at 120° C. The resulting product weighed 201 grams and had an amine number of 665 (theoretical 705.7). The compound N-butyl-β-aminopropionhydrazide has the structural formula:

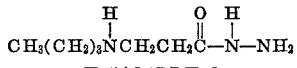

EXAMPLE 2

Preparation of N-butyl-β-aminopropionhydrazide

Four hundred twenty-five grams of methyl N-butyl-β-aminopropionate as prepared in Example B above were added slowly to a cooled rapidly stirred solution of 340 ml. of 97% hydrazine in 315 ml. of methanol. The reaction mixture was allowed to warm up to room temperature overnight and then most of the methanol was removed by distillation. Following this, the excess hydrazine was removed using a rotary evaporator and then high vacuum. The product weighed 418 grams and had an amine value of 685 (theoretical 705.7).

EXAMPLE 3

Preparation of N-octadecyl-β-aminopropionhydrazide

To 355 grams of methyl N-octadecyl-β-aminopropionate prepared in Example C were added 50 ml. of methanol. The mixture was heated to 55° C. and then 40 ml. of 97% hydrazine were added thereto. The reactants were refluxed for 24 hours and, after evaporation, there was obtained a residue which was recrystallized to yield 283.5 grams of product having an amine number of 305 (theoretical 316). N-octadecyl-β-aminopropionhydrazide has the structure:

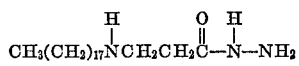

EXAMPLE 4

Preparation of N-methyl-β-aminopropionhydrazide

Thirty-seven grams of methyl N-methyl-β-aminopropionate as prepared in Example D and 15 ml. of 97% hydrazine in 10 ml. of methanol were refluxed overnight. Excess methanol and hydrazine were evaporated under vacuum to yield a water white liquid weighing 36 grams. This product had an amine number of 916 (theoretical 959) and the structure:

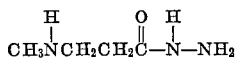

EXAMPLE 5

Preparation of N-benzyl-β-aminopropionhydrazide

One hundred forty-one grams of methyl N-benzyl-β-aminopropionate as prepared in Example E in 35 ml. of methanol were mixed with 37 ml. of 97% hydrazine. The reaction mixture was refluxed overnight and then excess hydrazine and methanol were removed by evaporation. One hundred thirty-five grams of product were obtained having an amine number of 549 (theoretical 587). N-benzyl-β-aminopropionhydrazide has the structural formula:

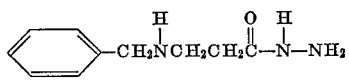

EXAMPLE 6

Preparation of N-dodecyl-β-aminopropionhydrazide

To the total amount of methyl N-dodecyl-β-aminopropionate obtained in Example F above were added 40 ml. of 97% hydrazine overnight. After evaporating off the excess hydrazine and methanol, the product was dissolved in 500 ml. of methanol and 100 ml. of benzene was added to the resulting solution to effect precipitation. The precipitate was collected by filtering at 5–10° C. After drying overnight in vacuo, 197 grams of product were obtained having an amine number of 401 (theoretical 414). The product has the structure:

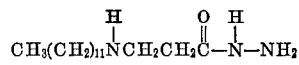

EXAMPLE 7

Preparation of N-octyl-β-aminopropionhydrazide

To 172.5 grams of methyl N-octyl-β-aminopropionate as obtained in Example G in 50 ml. of methanol were added 35 ml. of 97% hydrazine. The reactants were mixed and then refluxed overnight. Excess hydrazine and methanol were removed by evaporation and the product was redissolved in methanol. Recrystallization was effected from tetrahydrofurane. The product was collected and dried in vacuo over a two day period. One hundred thirty-one grams of product were obtained having an amine number of 510 (theoretical 521.8). N-octyl-β-aminopropionhydrazide has the structure:

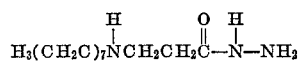

EXAMPLE 8

Preparation of n-phenyl-β-aminopropionhydrazide

To 173 grams of methyl N-phenyl-β-aminopropionate dissolved in 200 ml. of methanol were slowly added 50 ml. of 97% hydrazine. The reaction mixture was refluxed overnight. Excess hydrazine and methanol were removed by evaporation and there was obtained 168 grams of product. This product was dissolved in 300 ml. each of methanol and tetrahydrofuran. The resulting solution was cooled to 5° C. which caused precipitation. The precipitate was collected by filtration and dried in vacuo to yield 35 grams of product having an amine number of 617.5 (theoretical 626.8). The N-phenyl-β-aminopropionhydrazide has the formula:

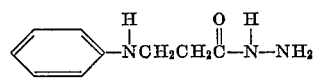

EXAMPLE 9

Preparation of N-methyl-β-iminodipropionhydrazide

One hundred thirty-nine grams of ethyl-N-methyl-β-iminodipropionate as prepared in Example H, 47 ml. of 97% hydrazine and 45 ml. of methanol were mixed and refluxed overnight. After evaporating off the excess hydrazine and solvent, the product was recrystallized from tetrahydrofuran. The dried precipitate weighed 113.5 grams had an amine value of 814 (theoretical 829). N-methyl-β-iminodipropionhydrazide has the structure:

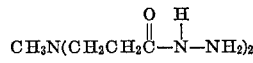

EXAMPLE 10

Preparation of mixed N-methyl-β-aminopropionhydrazide and N-methyl-β-iminodipropionhydrazide One hundred twelve and one half grams of ethyl N-methyl-β-aminopropionate (0.858 mole) and 118.5 grams ethyl N-methyl-β-iminodipropionate (0.513 mole) were dissolved in 200 ml. of methanol. To this solution were added 85 ml. of 97% hydrazine and then the reaction mixture was refluxed overnight. After removing the excess solvent and hydrazine by evaporation, there was obtained 203.5 grams of product having an amine value of 830 (theoretical 892.3). The product was a mixture of N-methyl-β-aminopropionhydrazide and N-methyl-β-iminodipropionhydrazide.

The hydrazides of the present invention are used in an amount sufficient to cure the epoxy resin to an insoluble and infusible polymer. Preferably, the hydrazides are used in ratios by weight curing agent to epoxy resin of from 5:95 to 75:25 and, even more preferably, from 5:90 to 25:75.

As indicated previously, the present invention consists of the hydrazides, curable compositions of the hydrazides and epoxy resins, partically cured compositions of the hydrazides and epoxy resins and the ultimately prepared insoluble and infusible polymers prepared from the hydrazides and epoxy resins. The curable compositions may be prepared simply by admixing the epoxy resin and the hydrazide in the desired proportions. Such compositions are stable for extended periods of time at ambient room temperature and yet can be cured rapidly by heating to elevated temperatures. They may or may not be homogeneous.

The partially cured or B-stage resins may be prepared by admixing the hydrazide and epoxy resin in the desired proportions, heating the reaction mixture to temperatures of about 30° C. to about 200° C., preferably 35° C. to 170° C., for a short period of time and terminating the reaction by cooling. By "B-stage" resin is meant a partially reacted product which will undergo little or no physical change during extended storage at ambient room temperatures and in which the reactants are homogeneously compataible in a one component, stable compound ready for final curing at elevated temperatures. In general, a "B-stage" resin will exist when the reaction is from about 5 to 90% complete.

The cured compositions of the present invention are prepared by heating the curable compositions or the partially cured compositions at elevated temperatures for a sufficient length of time to form insoluble and infusible polymers. Preferred heating temperatures are from about 300 to 450° F.

The hydrazide-epoxy resin compositions of my invention can also contain conventional additives such as pigments, fillers, flow control and anti-caking agents, accelerators, solvents and the like. In a preferred embodiment, the curable compositions or partially cured compositions are finely divided to form powders which find particular use in the coating of various substrates. Such powders give good edge coverage of sharp corners and thin panel edges. The B-stage powders are homogeneous, one-component materials which are stable at ambient room temperatures and yet can be rapidly cured at elevated temperatures. The same can be applied by the use of spray techniques or by forming a fluidized bed thereof. Normally the substrate to be coated is heated prior to being sprayed with the powder or being dipped into the fluidized bed. The powder then melts and coats the substrate. Subsequent curing, if necessary, can be in ovens heated to elevated temperatures. The powders of the present invention are especially valuable because of their quick cure characteristics.

The powders preferably contain flow control and anti-caking agents. Examples of such agents include amorphous silicas, dehydrated silica gels, various natural silicates such as attapulgite and kaolin clays, amorphous alumina, talc, and finely divided calcium carbonate. The described agents are preferably used in an amount sufficient to improve the flowout of the powder on melting with heat and/or to prevent fusing or caking of the powder at moderately high temperatures, i.e. 100–125° F. Obviously, the amounts of said agents can vary considerably, depending on the particular agent used and the result desired. Generally, said agents will be used in amounts of about 2 to 50% by weight based on the weight of the epoxy resin and the hydrazide.

The hydrazide-epoxy resin compositions, and particularly the coating powders derived therefrom, may also contain colorants, pigments, or fillers. Examples of suitable pigments include titanium dioxide (white finish), lead chromate (yellow), light and medium chrome yellow, chromium oxide (green), ultramarine blue, red iron oxide, and toluidine red. The amounts of said pigments can be varied widely to give different shades of different colors. Additionally, mixtures of different pigments may be used. Generally, said pigments are used in amounts of about 1 to 15% by weight based on the weight of the epoxy resin and hydrazide.

The hydrazide-epoxy resin compositions of this invention are useful not only in the coatings art but also in the preparation of laminates, moldings and the like. Preferred epoxy resins to be used are the glycidyl ethers of polyhydric phenols such as Bisphenol A.

The following examples serve to illustrate the various hydrazide-epoxy resin compositions of the present invention.

EXAMPLE I

Approximately 50% by weight isopropanol solutions of 177 grams of epoxy resin 1 (a condensation product of Bisphenol A and epichlorohydrin having an epoxy equivalent weight of about 177) and 159 grams of N-butyl-$\beta$-aminopropionhydrazide as prepared in Example 1 above were mixed at 50° C. This mixture was heated to 80° C. with a noticeable exothermic reaction occurring. Refluxing at 80° C. was conducted for 0.5 hours with no external heating required. After this period, refluxing was continued for an additional 18 hours and then the isopropanol solvent was removed by evaporation. There was obtained 346 grams of a clear, straw colored, semi-solid having an amine number of 309.8 and a percent oxirane oxygen of 0.15.

EXAMPLE Ia

Ninety-nine grams of epoxy resin 1 and 101 grams of the pre-reaction product of Example I were mixed and heated to 80° C. This material was then applied on hot steel plates (3" x 6" x 0.075") and baked in an oven at 165° C. After a six minute heating period, the coating passed the ⅛" Mandrel Bend Test, had a Pencil Hardness of B and an extensibility of 60% (as measured on the General Electric impact-flexibility tester). A plate heated for 10 minutes also gave a coating having a Pencil Hardness of B and which passed the ⅛" Mandrel Bend Test. Plates heated for only two and four minutes failed to pass a ½" Mandrel Bend Test.

EXAMPLE Ib

Seventy-seven grams of the pre-reaction product of Example I and 75.5 grams of epoxy resin 1 were mixed at 80° C. The resulting product was poured on Teflon cloth and allowed to stand for three days. There was obtained a solid which had a melting point of 80–90° C. This solid was pulverized to pass a 50-mesh screen and then a 47.2% by weight solution thereof in tetrahydrofuran was made, said solution having a viscosity of K–L on the Gardner scale. This solution was applied on steel plates (see Example Ia) and baked at 160° C. The coating obtained after a one minute bake failed the ½" Mandrel Bend Test. The coatings on plates baked for 2, 4 and 10 minutes all passed the ⅛" Mandrel Bend Test.

EXAMPLE II

To 284.3 grams of molten epoxy resin 2 (a condensation product of Bisphenol A and epichlorohydrin having an epoxy equivalent weight of about 925) at 150° C. were added 15.7 grams of N-butyl-$\beta$-aminopropionhydrazide as prepared in Example 2. The two reactants were mixed for two minutes and then the resulting partial reaction product was discharged onto a Teflon cloth at which time it solidified. This solid was ground with a Wiley mill and then through a Raymond mill so as to pass a 50 mesh screen. The resulting curable coating powder had the following properties:

Gel time at 300° F. _____ 3.5 to 4 min.
Gel time at 400° F. _____ 1.75 min.
Initial flow at 300° F. _____ 1.22 inch.
Caking at 150° F. _____ None after 16 hours.
Cure time: [1]
   Cured at 450° F. for 1, 2, 3 and 4 min. ____ All passed the Olson button Extensibility Test.
   Cured at 300° F. for 10, 15, 20 and 25 min. _____ Passed the Olson button Extensibility Test at 25 min.

[1] Hot steel plates sprayed with the powder and then cured as indicated.

EXAMPLE III

Into a Baker-Perkins mixer were charged 4005 grams of epoxy resin 2, 169 grams of Santocel C (a commercially available amorphous silica manufactured by Monsanto Chemical Company having the following properties: Silica (as $SiO_2$)—89.5–91.5%; pH—3.5–4.0; particle size—3–5 microns in diameter; bulk density—6 lbs./cu. ft.) and 1056 grams of Mineralite 3x mica (a commercially available mica manufactured by the Mineralite Sales Corporation). These materials were thoroughly mixed and heated to 130° C. At this temperature 220 grams of melted N-butyl-β-aminopropionhydrazide as prepared in Example 2 were added. The reactants were allowed to mix for 2.25 minutes at which time the resulting B-stage resin was cooled with Dry Ice. The resin was preground using a Wiley mill and then ground using a small micropulverizer. To 3600 grams of this powder were added 291 grams of $TiO_2$ (pigment). The mixture was placed in a mix muller and mixed for one hour. The resulting powder had the following properties:

Gel time at 300° F.—6.5 to 7 min.
Gel time at 400° F.—3 min.
Initial flow at 300° F. [1]—0.875 inch.
Caking at 150° F. [2]—none after 16 hours.
Coating smoothness—very waxy.
   (Steel plates heated to 300° F. dipped into a fluidized bed of the powder.)
Percent edge coverage—62.
Estimated cure time at 300° F.—25 min.
Estimated cure time at 450° F.—4 min.
Solvent resistance—after five hour exposure: in toluene—hard; in acetone—soft; in chloroform—destroyed.
   (Specimen 1″ x 4″ x 0.56″ steel panels coated and cured at 400° F.)
Stability (objective observation of flow properties and coating of panels):
   At 110° F.—satisfactory after 200 hours.
   At 130° F.—satisfactory up to 100 hours.
   At 150° F.—satisfactory up to one hour.

[1] The flow of a 3 gr., one inch diameter pellet placed on a 60 degree inclined hot plate stabilized at 300° F.
[2] Caking measured by placing a 50 gr. sample of the powder in a closed 4 oz. wide mouth glass jar. After 16 hours the container was inverted and not made of whether or not the powder was free flowing. Since it was free flowing, the powder was given a caking rating of none.

EXAMPLE IV

To 176 grams of epoxy resin 2 (melted at 140° C.) were added with stirring 24 grams of N-octadecyl-β-propionhydrazide as prepared in Example 3. Stirring was continued for one minute and then the reaction mixture was B-staged in an oven at 165° C. for ten minutes. The B-stage resin was cooled and pulverized so as to pass through a 50 mesh screen. Steel plates of 3″ x 6″ x 0.075″ preheated to 165° C. were coated with the powder and then baked at 165° C. for nine minutes. The resulting coatings passed the ⅛″ Mandrel Bend Test and gave an extensibility of 60% (as measured on the General Electric impact-flexibility tester).

EXAMPLE V

Twenty-eight and one half grams of N-methyl-β-aminopropionhydrazide as prepared in Example 4 were mixed with 123.5 grams of epoxy resin 1 and heated. The mixture became homogeneous at 42° C. at which time heating was stopped. The temperature of the reaction mixture rose to a maximum of 110° C. at which point it was poured onto Teflon cloth. After standing overnight, the B-stage resin was pulverized and the resulting powder was sprayed onto steel panels preheated to 300° F. and 450° F. The panels sprayed at 300° F. were cured at 300° F. for two and five minutes. The panels sprayed at 450° F. were cured at 450° F. for one, two and three minutes. The latter panels all passed the Olson Button Extensibility Test. The panels baked at 300° F. passed the Olson Button Extensibility Test after five minutes curing time.

EXAMPLE VI

To 7.3 grams of epoxy resin 1 were added 2.7 grams of N-benzyl-β-aminopropionhydrazide as prepared in Example 5 and the mixture was heated to 35° C. Steel plates were coated with this curable composition and baked at 165° C. for four, eight, nine and ten minutes. After a nine minute bake, the coating passed the ⅛″ Mandrel Bend Test and also had an extensibility of greater than 60% (as measured on the General Electric impact flexibility tester).

EXAMPLE VII

One hundred grams of epoxy resin 2 were melted at 140° C. and 19.9 grams of N-benzyl-β-aminopropionhydrazide as prepared in Example 5 were added thereto with stirring. The mixing was continued for 2.5–3 minutes and then the reaction mixture was poured onto Teflon. The cooled product was reheated in an oven at 165° C. for five minutes and then cooled. The resulting B-stage resin was pulverized and the powder was sprayed onto steel panels heated to 450° F. The panels were baked at 450° F. for periods of one, two and three minutes. The coatings on the panels baked for three minutes passed the Olson Button Extensibility Test.

EXAMPLE VIII

One hundred seventy-seven grams of epoxy resin 3 (a condensation product of Bisphenol A and epichlorohydrin having an epoxy equivalent weight of about 525) were melted at 110° C. and 22.75 grams of N-benzyl-β-aminopropionhydrazide as prepared in Example 5 were added thereto with stirring. The mixing was continued for 3.5 minutes with a maximum temperature of 130° C. being obtained. The resulting product was then poured on Teflon cloth and heated in an oven at 165° C. for an additional five minutes. The B-stage resin was cooled and pulverized to pass a 50 mesh screen. The powder so obtained was sprayed onto steel panels heated to 450° F. and then the coated panels were cured at 450° F. for one, two and three minutes. The panels cured for two and three minutes passed the Olson Button Extensibility Test.

EXAMPLE IX

One hundred seventy grams of epoxy resin 3 were melted at 130° C. Thirty grams of N-dodecyl-β-aminopropionhydrazide as prepared in Example 6 were added to the molten resin and mixed for three minutes. The resulting partially cured composition was poured onto Teflon, cooled and pulverized so as to pass a 50 mesh screen. The powder so obtained was sprayed onto steel panels preheated to 450° C. The coated panels were baked at 450° F. for one, two and three minutes. The coatings of the panels baked for two and three minutes passed the Olson Button Extensibilty Test.

EXAMPLE X

One hundred eighty grams of epoxy resin 2 were melted at 140° C. and 20 grams of N-dodecyl-β-aminopropion- hydrazide as prepared in Example 6 were added thereto.

15

After a mixing period of five minutes, the partially cured composition was poured onto Teflon where it solidified. Steel panels coated and baked as in Example IX passed the Olso Button Extensibility Test after baking times of two and three minutes.

EXAMPLE XI

One hundred seventy-five grams of epoxy resin 3 were melted at 130° C. and 25 grams of N-octyl-β-aminopropionhydrazide as prepared in Example 7 were added thereto with stirring. After a mixing period of four minutes, the B-stage resin was poured onto Teflon for cooling and pulverized so as to pass a 50 mesh screen. Steel panels were coated with the powder as in Example IX and baked in the same manner. The coatings of all of the panels (one, two and three minute cure times) passed the Olson Button Extensibility Test.

EXAMPLE XII

One hundred eighty-five grams of epoxy resin 2 were melted at 150° C. and 15 grams of N-octyl-β-aminopropionhydrazide as prepared in Example 7 were added thereto with stirring. After a mixing period of three minutes, the product was poured onto Teflon, cooled, pulverized and used to coat steel panels as in Example XI. The coatings of the panels cured at 450° F. for two and three minutes passed the Olson Button Extensibility Test.

EXAMPLE XIII

To 179.6 grams of melted epoxy resin 3 (at 120° C.) were added 20.4 grams of N-phenyl-β-aminopropionhydrazide as prepared in Example 8. The reactants were mixed and, when 140° C. was reached, the product was poured onto Teflon for cooling. After pulverization, the resulting powder was used to coat steel panels as in Example XII and the cured coatings baked for two and three minutes passed the Olson Button Extensibility Test.

EXAMPLE XIV

One hundred eighty grams of epoxy resin 3 were melted at 130° C. and 20 grams of N-methyl-β-iminodipropionhydrazide as prepared in Example 9 were added thereto and the reaction mixture stirred for three minutes. The partially cured resin was poured onto Teflon for cooling and then the cooled solid was pulverized so as to pass a 50 mesh screen. The resulting powder was sprayed onto steel panels preheated to 450° F. and then the coated panels were baked at 450° F. for one, two and three minute periods. In all cases the coatings passed the Olson Button Extensibility Test. Additional panels preheated to 300° F. were sprayed and cured at 300° F. for three and five minutes. In both cases, the coatings passed the Olson Button Extensibility Test.

EXAMPLE XV

One hundred eighty-nine grams of epoxy resin 2 were melted at 140° C. and 11 grams of N-methyl-β-iminodipropionhydrazide as prepared in Example 9 were added there with stirring. After a three minute mixing period, the B-stage resin was poured onto Teflon to cool. It was then pulverized so as to pass through a 50 mesh screen. The resulting coating powder was sprayed onto steel panels preheated to 450° F. and then the coated panels were cured in an oven at 450° F. for one, two and three minutes. The coatings of the panels heated for two and three minutes passed the Olson Button Extensibility Test.

EXAMPLE XVI

To 120 grams of epoxy resin 1 heated to 90° C. were added 30 grams of a mixture of N-methyl-β-aminopropionhydrazide and N-methyl-β-iminodipropionhydrazide as prepared in Example 10. After blending (an exotherm developed), the product was poured into heat distortion tubes. The product was cured in the tubes for 45 minutes using a steam cone and then one hour in an oven at 300° F. The cured product had a heat distortion temperature (HDT) of 104° C. and a Barcol Hardness of 57.

EXAMPLE XVII

Nine grams of epoxy resin 1 and 1 gram of the mixture of hydrazides of Example 10 were heated on a hot plate to 170° C. The contents were stirred and then poured onto Teflon to cool. This resin crosslinked when heated at 160° C. for 2–3 minutes.

The hydrazides of the present invention are excellent curing agents for epoxy resins as shown by the above examples. Coating powders prepared from such systems are of high utility. Thus they are stable and cure rapidly to provide coatings of good properties. In contrast, other hydrazides as shown by the following examples have very inferior properties as curing agents for epoxy resins.

EXAMPLE A–I

To 3.85 grams of epoxy resin 1 were added 4.6 grams of a 25% by weight solution in tetrahydrofuran of N-t-butyl-β-aminopropionhydrazide. This material was applied on steel panels and baked at 160° C. The coating was still tacky after a 30 minute cure time. Such extended cure time would make this hydrazide undesirable for powder systems.

N-t-butyl-β-aminopropionhydrazide has the formula:

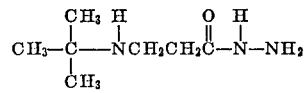

It was prepared by slowly adding 252 ml. of methyl acrylate to an agitating solution of 198.5 grams of tertiary butylamine in 600 ml. of methanol at 12° C. This solution was allowed to come to room temperature overnight and then most of the methanol was distilled off. The residue was distilled using water pump vacuum to yield 432 grams of product (methyl-tert-butyl-β-aminopropionate) having an 8.3% nitrogen content (theoretical 8.8). Three hundred seventy grams of this product were agitated with 150 ml. of 97% hydrazine at 90 to 100° C. for twelve hours. After allowing the reaction mixture to stand overnight, the excess hydrazine was evaporated using water pump vacuum to a temperature of 115° C. The resulting hydrazide was a white crystalline solid which weighed 358 grams and had an amine number of 696.5 (theoretical 705.6).

EXAMPLE A–II

A solution of 3.7 grams of epoxy resin 1 and 5.2 grams of a 25% by weight solution of N-cyclohexyl-β-aminopropionhydrazide in tetrahydrofuran was applied on steel panels preheated to 160° C. and the panels were baked at 160° C. for 4 minutes and 10 minutes. In each case the product failed to pass the ½″ Mandrel Bend Test and also showed poor compatibility. In view of such results, no further tests were conducted on this system.

N-cyclohexyl-β-aminopropionhydrazide has the formula:

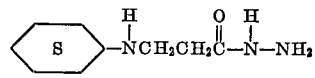

It was prepared as follows: Ninety-three ml. of methyl acrylate were added slowly to a cooled solution of 99 grams of cyclohexylamine in 100 ml. of methanol. This solution was allowed to stand for a two day period and then the methanol solvent was removed by evaporation. The material was fractionated under vacuum through a two ft. Vigreux column topped with a Claisen head. A total yield of 185 grams of product (methyl N-cyclohexyl-β-aminopropionate) having a nitrogen content of 7.5 (theoretical 7.57) was obtained. Fifty three ml. of 97% hydrazine were added to an agitating solution of 152 grams of the above product in 150 ml. of methanol. The reaction was exothermic and, when the temperature reached 62° C., the reaction mixture was briefly cooled. It was refluxed at about 85° C. overnight and then evaporated under vacuum. A white crystalline solid weighing 155 grams and having an amine number of 605.5 (theoretical 606.5) was obtained.

EXAMPLE A-III

To 2.3 grams of N-sec.-butyl-β-aminopropionhydrazide were added 7.7 grams of epoxy resin 1. These materials were thoroughly mixed and heated to 140° C. The exothermo that formed caused the temperature to rise to 180° C. This product did not cure even after 1.5 hours at 165° C. when applied as a coating to steel panels.

N-sec.-butyl-β-aminopropionhydrazide has the formula:

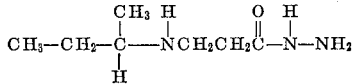

It was prepared in the following manner: To 105 grams of secondary butylamine dissolved in 100 ml. of methanol were slowly added 140 ml. of methyl acrylate at 10–20° C. The mixture was allowed to stand overnight and then the methanol solvent was removed by evaporation. The product was fractionated in vacuo through a two ft. Vigreux column topped with a Claisen head. There was obtained 211 grams of product (methyl-sec.-butyl-β-aminopropionate) having a nitrogen content of 8.74% (theoretical 8.8) to 208.5 grams of this product in 50 ml. of methanol were added 60 ml. of 97% hydrazine. The reactants were refluxed at 85° C. for 22 hours. The mixture was evaporated at 110° C. to give 199 grams of the hydrazide having an amine number of 697 (theoretical 705.7).

It is to be understood that the invention is not to be limited to the exact details of operation or he exact compositions shown or described, as obvious modifications and equivalents will be apparent to those skilled in the art and the invention is to be limited only by the scope of the appended claims.

I claim:
1. The compound having the formula

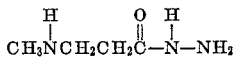

2. The compound having the formula

3. The compound having the formula

4. The compound having the formula

5. A compound having the formula

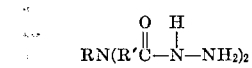

where R is an unsubstituted alkyl radical of 1 to 18 carbon atoms and R' is an unsubstituted alkylene radical of 2 to 9 carbon atoms.

6. The compound having the formula

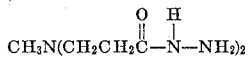

References Cited

UNITED STATES PATENTS 3,250,760   5/1966   Brenner.
2,974,118   3/1961   Nisck.

OTHER REFERENCES

Rohnert, Archiev. der Pharmazie, vol. 296, p. 257–6 (1963).

HENRY R. GILES, Primary Examiner

HARRY I. MOATZ, Assistant Examiner

U.S. Cl. X.R.

132—161; 260—2, 18, 47, 404.5, 472, 558, 559